United States Patent [19]

McElroy

[11] 4,164,273
[45] Aug. 14, 1979

[54] RESILIENT SHIELD FOR VEHICLE WHEEL BRAKE ASSEMBLIES

[75] Inventor: Eugene L. McElroy, Enon Valley, Pa.

[73] Assignee: Enon Valley Industries, Inc., Enon Valley, Pa.

[21] Appl. No.: 846,253

[22] Filed: Oct. 27, 1977

[51] Int. Cl.² .................................................. F16D 65/00
[52] U.S. Cl. .................................................. 188/218 A
[58] Field of Search ............ 188/18 R, 218 R, 218 A, 188/264 W; 192/112; 114/221 R; 301/6 WB; 308/80

[56] References Cited

U.S. PATENT DOCUMENTS

| 1,641,081 | 8/1927 | Heymann | 114/221 R |
| 2,013,805 | 9/1935 | McIntosh | 188/218 R |
| 2,720,947 | 10/1955 | Martin | 188/218 A |
| 2,995,389 | 8/1961 | Johnson | 308/80 |

FOREIGN PATENT DOCUMENTS

| 40143 | 5/1929 | Denmark | 188/218 A |
| 1254167 | 1/1961 | France | 188/218 R |
| 5003 | of 1902 | United Kingdom | 114/221 R |
| 1224648 | 3/1971 | United Kingdom | 188/18 R |

*Primary Examiner*—Edward R. Kazenske
*Attorney, Agent, or Firm*—Webster B. Harpman

[57] ABSTRACT

A water and dust shield for protecting the interior of vehicle brake assemblies provides a resilient and flexible flanged disc which is centrally apertured and partially split transversely to provide for its installation on an axle to enclose a rotating brake drum on a wheel carried by the axle. A plurality of arms attached to the shield about the central aperture enable a clamping band to secure the shield to the axle in slightly spaced relation thereto.

6 Claims, 3 Drawing Figures

RESILIENT SHIELD FOR VEHICLE WHEEL BRAKE ASSEMBLIES

BACKGROUND OF THE INVENTION (1) Field of the Invention

This invention relates to brake protection devices for vehicles wheels arranged to prevent the entry of dirt and water into the brake mechanism.

(2) Desciption of the Prior Art

Prior devices have generally utilized metal components seeking to enclose the brake mechanism such as may be seen in U.S. Pat. Nos. 2,013,945, 2,734,600 and 3,213,976. Generally a sheet metal stamping is attached to the axle adjacent the brake drum with the stamping shaped to extend radially to a point adjacent the rim of the vehicle wheel and provided with openings through which the brake actuating mechanism and the like may be positioned. In practice these sheet metal shields vibrate, pieces break away and road dirt and more importantly water reaches the brake mechanism and seriously reduces the braking ability required to stop the vehicle.

The prior art represented by the above mentioned patents requires modifications in the brake drum and wheel constructions that are commonly employed and are not therefore practical.

SUMMARY OF THE INVENTION

A resilient non metallic shield for vehicle wheel brake assemblies takes the form of a flanged flexible disc formed of a suitable synthetic resin or the like that is centrally apertured and partially split transversely so that it can be distorted and positioned over an axle adjacent a brake drum. A plurality of brackets extend at right angles from the central aperture and are positioned circumferentially of the axle and receive a clamping ring which secures the resilient shield in position with its circumferential flange overlapping the brake drum and adjacent wheel portions so as to effectively exclude water and dust therefrom.

DESCRIPTION OF THE PREFERRED EMBODIMENT

Figure 1:
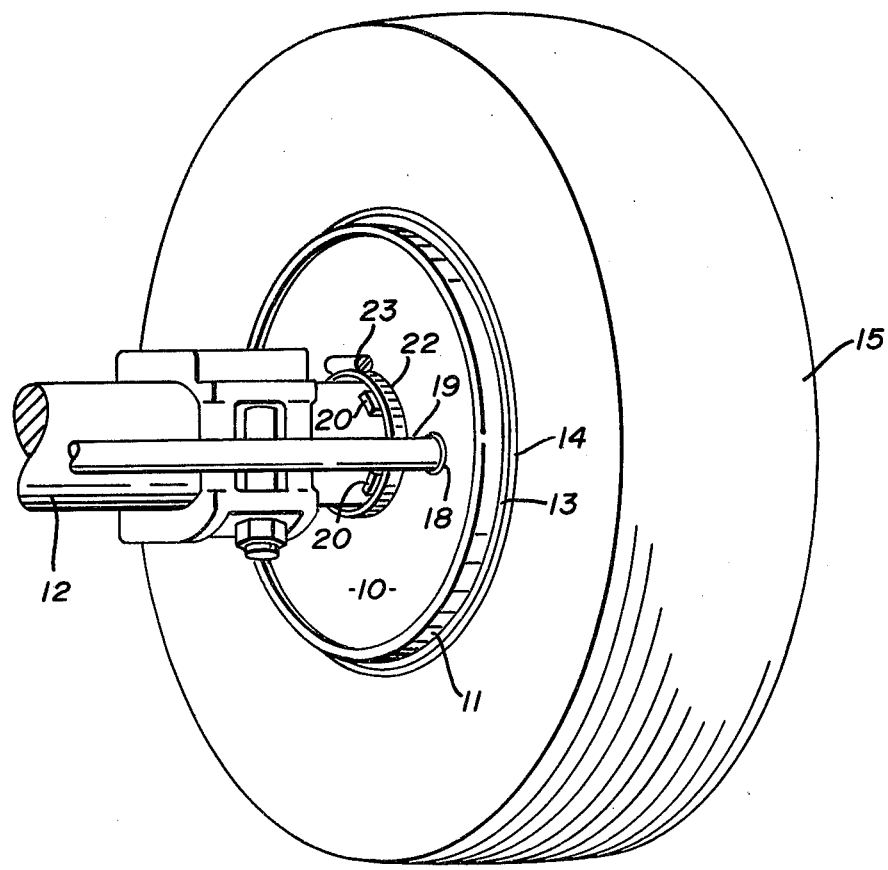
FIG. 1 is a perspective view of a vehicle wheel illustrating the tire, the wheel rim and a portion of the brake assembly and showing the resilient shield in position on the supporting axle and enclosing the brake assembly.

In the form of the invention chosen for illustration herein the resilient shield for vehicle wheel brake assemblies comprises a disc 10 having an annular peripheral flange 11 and as seen in FIG. 1 of the drawings it is positioned on an axle 12 so that the annular flange 11 overlies the braking mechanism including the brake drum 13 and that portion of the vehicle wheel inwardly of its rim 14. As seen in FIG. 1 a tire 15 is shown on the rim 14. In order that the disc 10 can be positioned on the axle 12 in shielding relation to the brake mechanism and the brake drum 13 it is centrally apertured as at 16 as best seen in FIGS. 2 and 3 of the drawings.

By referring thereto it will be observed that the disc 10 is also split partially transversely as at 17, the split extending through the right angular flange 11 at one side of the disc 10 and extends therethrough to the aperture 16. It then continues a distance beyond the aperture 16 and terminates at a point 18 where it may be enlarged to form an opening sufficient to receive a brake actuating rod 19 as seen in FIG. 1 of the drawings. Those skilled in the art will observe that brake mechanisms on trucks, tractors and trailers are frequently operated by partially rotating a rod on its longitudinal axis and the rod must therefore extend through any shield such as the one disclosed herein.

Figures 2, 3:
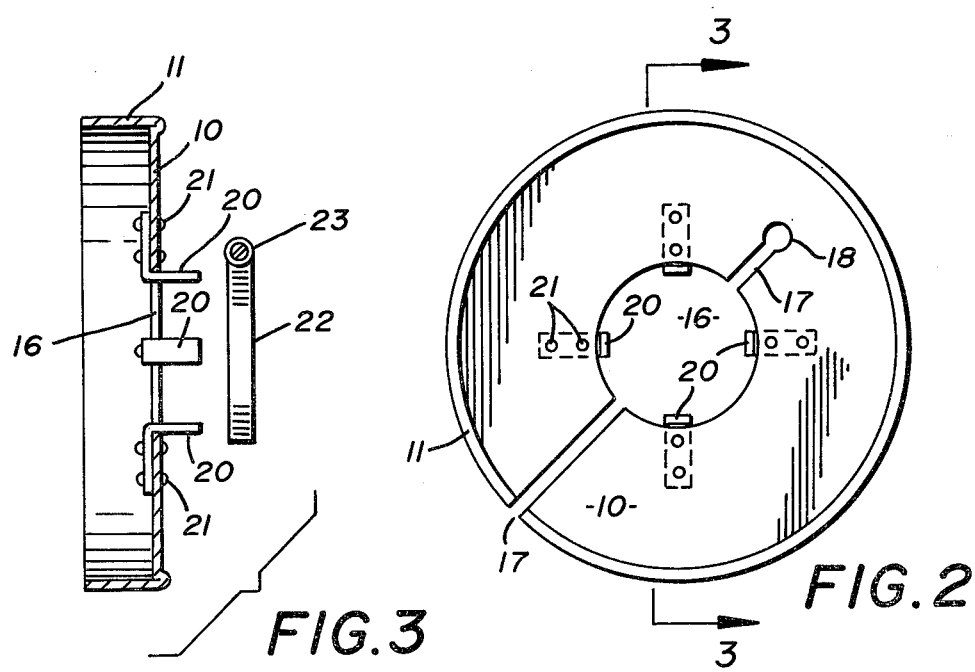
FIG. 2 is a plan view of the resilient shield.
FIG. 3 is a vertical section on line 3—3 of FIG. 2.

Still referring to FIGS. 2 and 3 of the drawings, it will be seen that a plurality of L-shaped brackets 20 are positioned in circumferentially spaced relation around the aperture 16 in the disc 10 and secured to the disc 10 by a plurality of fasteners such as rivets 21.

By referring again to FIG. 1 of the drawings, it will be seen that the brackets 20 are positioned around the exterior of the axle 12 and that a clamping band 22 has been positioned thereabout and tightened by its engaged clamping bolt 23 so as to secure the brackets 20 to the axle 12 and thereby suitably position the disc 10 and its annular flange 11 in spaced protective relationship to the axle 12 and the braking mechanism in the brake drum and wheel of the vehicle.

The clamping band 22 is a single length of metal with a plurality of transverse slots therein and it is attached at one end to a bracket through which the clamping bolt 23 is positioned. The arrangement is such, as will be recognized by those skilled in the art, that rotation of the clamping bolt 23 engages the opposite end of the clamping band 22 and moves it so as to reduce the diameter of the band 22. The slot 17 and the resilient distortable characteristics of the disc 10 permit the same to be distorted so as to be positioned over the wheel and axle assembly seen in FIG. 1 of the drawings to the position illustrated. The end of the slot 17 which was indicated by the numeral 18 is enlarged sufficiently to permit the brake actuating rod 19 to be positioned therethrough and when the disc 10 is secured by the clamping band 22 to the axle 12 the slot 17 is closed as the edges of the slot closely abut one another.

In operation the constant vibration of the wheel of the vehicle does not adversely affect the resilient flexible characteristics of the synthetic resin from which the disc is formed and the disc accordingly stays in place and protects the braking mechanism from dust and more importantly water which renders the brakes relatively ineffective.

It will thus be seen that a resilient shield for vehicle wheel brake assemblies has been disclosed which may be inexpensively formed, quickly and easily attached to a vehicle wheel so as to protect the brake assembly and that it will stay in position and avoid the failures of the prior art devices and having thus described my invention,

What I claim is:

1. A resilient non-metallic sheild for vehicle wheel brake assemblies comprising a unitary flexible and resilient plastic disc having a flange on its peripheral edge and a central aperture, means on said disc partially within the aperture for engagement about an axle of a vehicle to which the shield is applied, said means spacing the edge of the disc about the aperture from said axle, said disc having a continuously open slot defined therein on a transverse diameterical line extending partially thereacross so as to permit the same to be distorted and positioned over said axle, said slot extending through said disc peripheral edge on one side of said aperture, along said diameterical line into said central aperture and continuing along said diameterical line a distance beyond said aperture to a terminal point of said slot located between said aperture and said disc peripheral edge on the other side of said aperture, said disc being unitary and unsplit in the area thereof which is located between said terminal point and said disc peripheral edge.

2. The resilient shield set forth in claim 1 and wherein said means comprises a plurality of brackets secured to the disc and extending outwardly from said disc at right angles thereto.

3. The shield set forth in claim 1 and wherein said means comprises a series of brackets secured to the disc and extending at right angles therefrom and a clamping device positioned thereover for urging the same against said axle.

4. The shield set forth in claim 1 and wherein the peripheral edge of said disc is thickened where it joins said flange to form an annular rib.

5. The resilient nonmetallic shield of claim 1 and wherein the means on the disc adjacent the aperture comprises a plurality of L-shaped brackets secured to the disc in circumferentially spaced relation by rivets and extending outwardly of said aperture and oppositely of said flange and wherein an annular clamping band is positioned over said extending brackets and arranged, when the diameter of the clamping band is reduced, to frictionally engage said bracket extensions on said axle so as to support said disc securely thereon spaced from said axle.

6. The sheild set forth in claim 1 wherein said terminal point is located approximately half-way between said aperture and said disc peripheral edge.

* * * * *